United States Patent
Por et al.

(10) Patent No.: US 9,575,552 B2
(45) Date of Patent: Feb. 21, 2017

(54) DEVICE, METHOD AND SYSTEM FOR OPERATION OF A LOW POWER PHY WITH A PCIE PROTOCOL STACK

(71) Applicant: INTEL CORPORATION, Santa Clara, CA (US)

(72) Inventors: Choon Gun Por, Georgetown (MY); Su Wei Lim, Klang (MY)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 14/129,545

(22) PCT Filed: Apr. 17, 2013

(86) PCT No.: PCT/US2013/037000
§ 371 (c)(1),
(2) Date: Dec. 26, 2013

(87) PCT Pub. No.: WO2014/171937
PCT Pub. Date: Oct. 23, 2014

(65) Prior Publication Data
US 2015/0220140 A1    Aug. 6, 2015

(51) Int. Cl.
*G06F 13/36* (2006.01)
*G06F 1/32* (2006.01)
(Continued)

(52) U.S. Cl.
CPC ............ *G06F 1/3296* (2013.01); *G06F 1/266* (2013.01); *G06F 13/364* (2013.01);
(Continued)

(58) Field of Classification Search
None
See application file for complete search history.

(56) References Cited

U.S. PATENT DOCUMENTS

| 2004/0088590 A1 | 5/2004 | Lee et al. |
| 2009/0052903 A1 | 2/2009 | Mussatt et al. |

(Continued)

FOREIGN PATENT DOCUMENTS

| WO | WO-2012052450 | 4/2012 |
| WO | WO-2013048395 | 4/2013 |

OTHER PUBLICATIONS

"PCT, International Search Report and Written Opinion of the International Searching Authority for International Application No. PCT/US2013/037000", (Jan. 29, 2014), Whole Document.

(Continued)

*Primary Examiner* — Henry Tsai
*Assistant Examiner* — Dean Phan
(74) *Attorney, Agent, or Firm* — Blakeley, Sokoloff, Taylor & Zafman LLP

(57) ABSTRACT

Translation circuitry for facilitating communication between a protocol stack for a PCIe™ communication protocol and a PHY layer for a low power communication standard. In an embodiment, the translation circuitry includes logic is to variously convert signaling between two or more PHY interface standards. The one or more a PHY interface standards may include a PHY Interface for PCI Express (PIPE) specification and a standard for a comparatively low power communication protocol. In another embodiment, the low power communication standard is a Reference M-PHY Module Interface (RMMI) specification.

22 Claims, 8 Drawing Sheets

(51) Int. Cl.
*G06F 1/26* (2006.01)
*G06F 13/364* (2006.01)
*G06F 13/42* (2006.01)
*G06F 13/38* (2006.01)

(52) U.S. Cl.
CPC ...... *G06F 13/4221* (2013.01); *Y02B 60/1228* (2013.01); *Y02B 60/1235* (2013.01)

(56) References Cited

U.S. PATENT DOCUMENTS

| 2010/0284451 | A1* | 11/2010 | Murari | G06F 13/385 375/220 |
| 2011/0231685 | A1* | 9/2011 | Huang | G06F 1/3203 713/321 |
| 2012/0005506 | A1 | 1/2012 | Walsh | |
| 2012/0068735 | A1* | 3/2012 | Harriman | G06F 13/4282 326/63 |
| 2014/0122767 | A1* | 5/2014 | Hershko | G06F 13/405 710/313 |

OTHER PUBLICATIONS

MIPI, "Test and Debug Interface Framework, Apr. 7, 2006, Approved Version 3.2, Retrieved from http://www.mipi.org/sites/default/files/whitepapers/MIPI_TDWG_whitepaper_v3_2.pdf", (Apr. 7, 2006), 11 pgs.

Rubenstein, Roy, "Hybrids drive interfaces—USB 3.0 and PCIe 3.0 set to play an embedded role in mobile devices, Jan. 22, 2013, Retrieved from http://fplreflib.findlay.co.uk/articles/47459/P29-30.pdf", (Jan. 22, 2013), pp. 29-30.

Office Action for Korean Patent Application No. 2015-7025414, mailed Jul. 8, 2016, 5 pgs.

International Preliminary Report on Patentability PCT Application No. PCT/US2013/037000 mailed Oct. 29, 2015, 9 pages.

European Search Report for European Patent Application No. 13882346.3 Mailed Nov. 28, 2016, 8 pages.

Cosmic Circuits: "MIPI MPHY—An Introduction", Design & Reuse, Mar. 3, 2011, pp. 1-4. Retrieved from the Internet: URL: http://www.design-reuse.com/articles/25764/mipi-m-phy-ip.htm on Jan. 28, 2015.

* cited by examiner

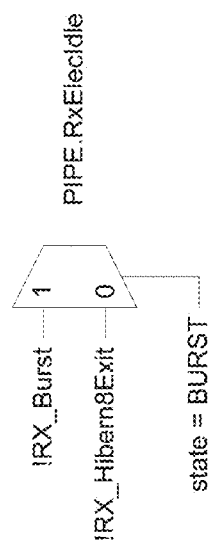
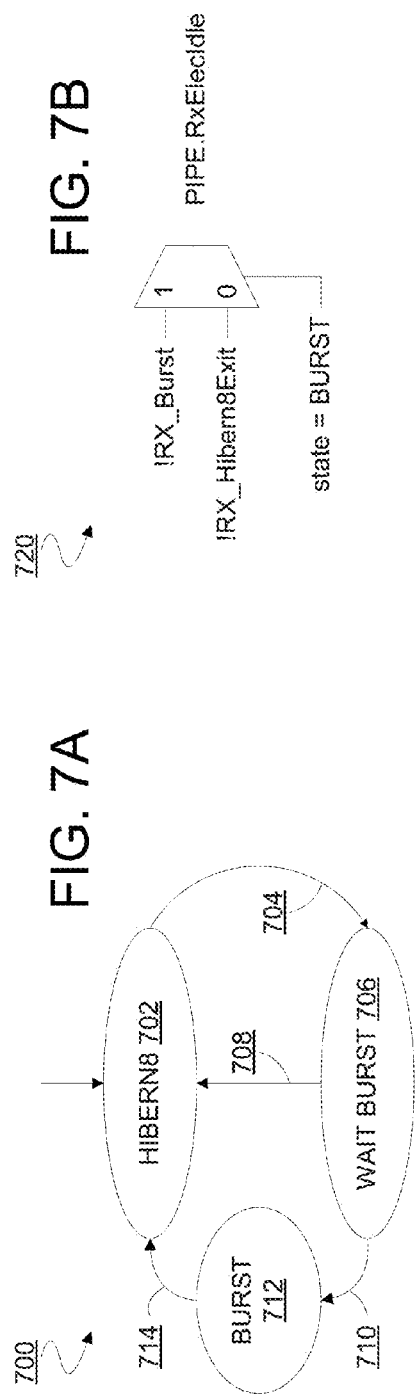
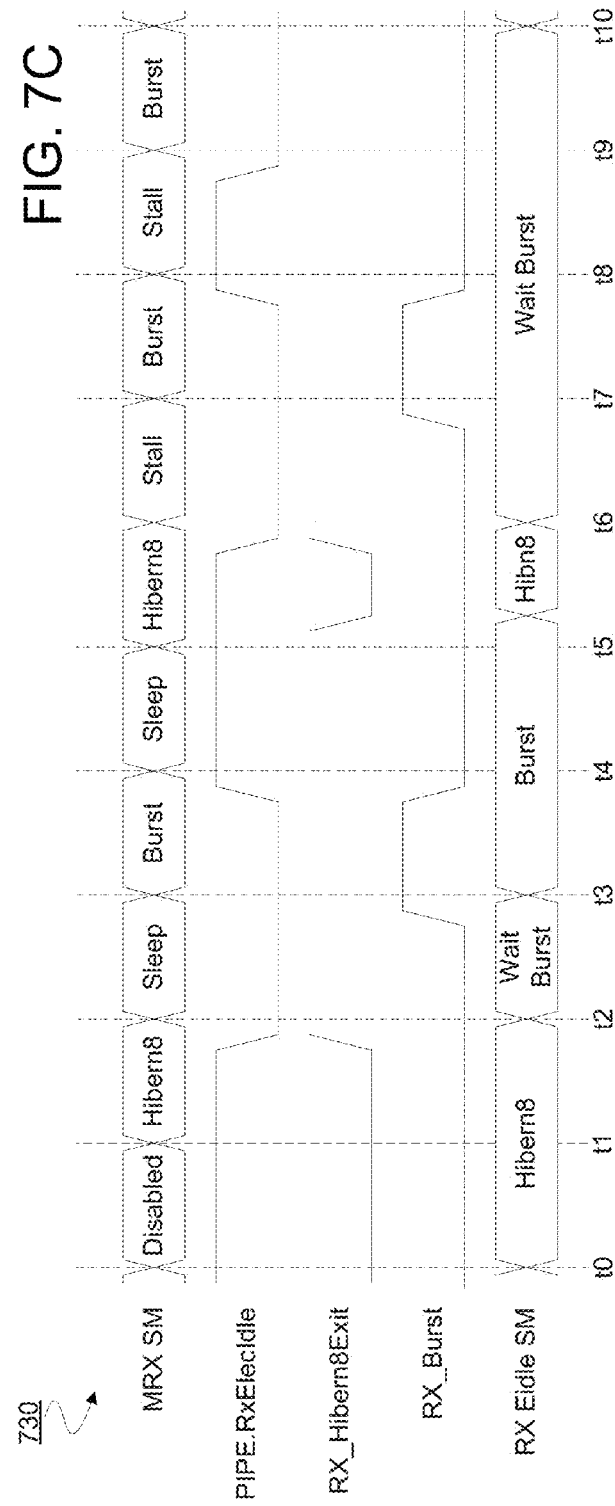

DEVICE, METHOD AND SYSTEM FOR OPERATION OF A LOW POWER PHY WITH A PCIE PROTOCOL STACK

CLAIM OF PRIORITY

This application is a U.S. National Phase application under 35 U.S.C. §371 of International Application No. PCT/US2013/037000, filed Apr. 17, 2013, entitled "DEVICE, METHOD AND SYSTEM FOR OPERATION OF A LOW POWER PHY WITH A PCIE PROTOCOL STACK," the entire contents of which are incorporated herein by reference.

Applicants respectfully submit that no new matter has been entered, and the amendments correct and clarify the previously submitted claim of priority.

BACKGROUND

1. Technical Field

Embodiments discussed herein relate generally to interconnect technologies.

2. Background Art

To provide communication between different devices within a system, some type of interconnect mechanism is used. A wide variety of such interconnects are possible depending on a system implementation. Oftentimes to enable two devices to communicate with each other, they share a common communication protocol.

One typical communication protocol for communications between devices in a computer system is a Peripheral Component Interconnect Express (PCI Express™ (PCIe™)) communication protocol in accordance with links based on the PCI Express™ Specification Base Specification version 3.0 (published Nov. 18, 2010) (hereafter the PCIe™ Specification). This communication protocol is one example of a load/store input/output (IO) interconnect system. The communication between the devices is typically performed serially according to this protocol at very high speeds. Various parameters regarding this protocol were developed with the intent to achieve maximum performance without regard to power efficiency, as the PCIe™ communication protocol was developed in the context of desktop computers. As a result, many of its features do not scale down to lower power solutions that could be incorporated into mobile systems.

Various other communication protocols are designed for devices to exchange information using lower power levels than those required for communications according to PCIe. As successive generations of computing and networking technologies become increasingly sensitive to incremental improvements in power efficiency, there is an increasing demand to integrate low-power solutions for communication within and/or between devices.

BRIEF DESCRIPTION OF THE DRAWINGS

The various embodiments of the present invention are illustrated by way of example, and not by way of limitation, in the figures of the accompanying drawings and in which:

FIG. 7A is a state diagram illustrating operations for generation of an electric idle control signal according to an embodiment.

FIG. 7B is a block diagram illustrating elements of a circuit for generation of an electric idle control signal according to an embodiment.

FIG. 7C is a timing diagram illustrating generation of an electric idle control signal according to an embodiment.

DETAILED DESCRIPTION

Figure 1:
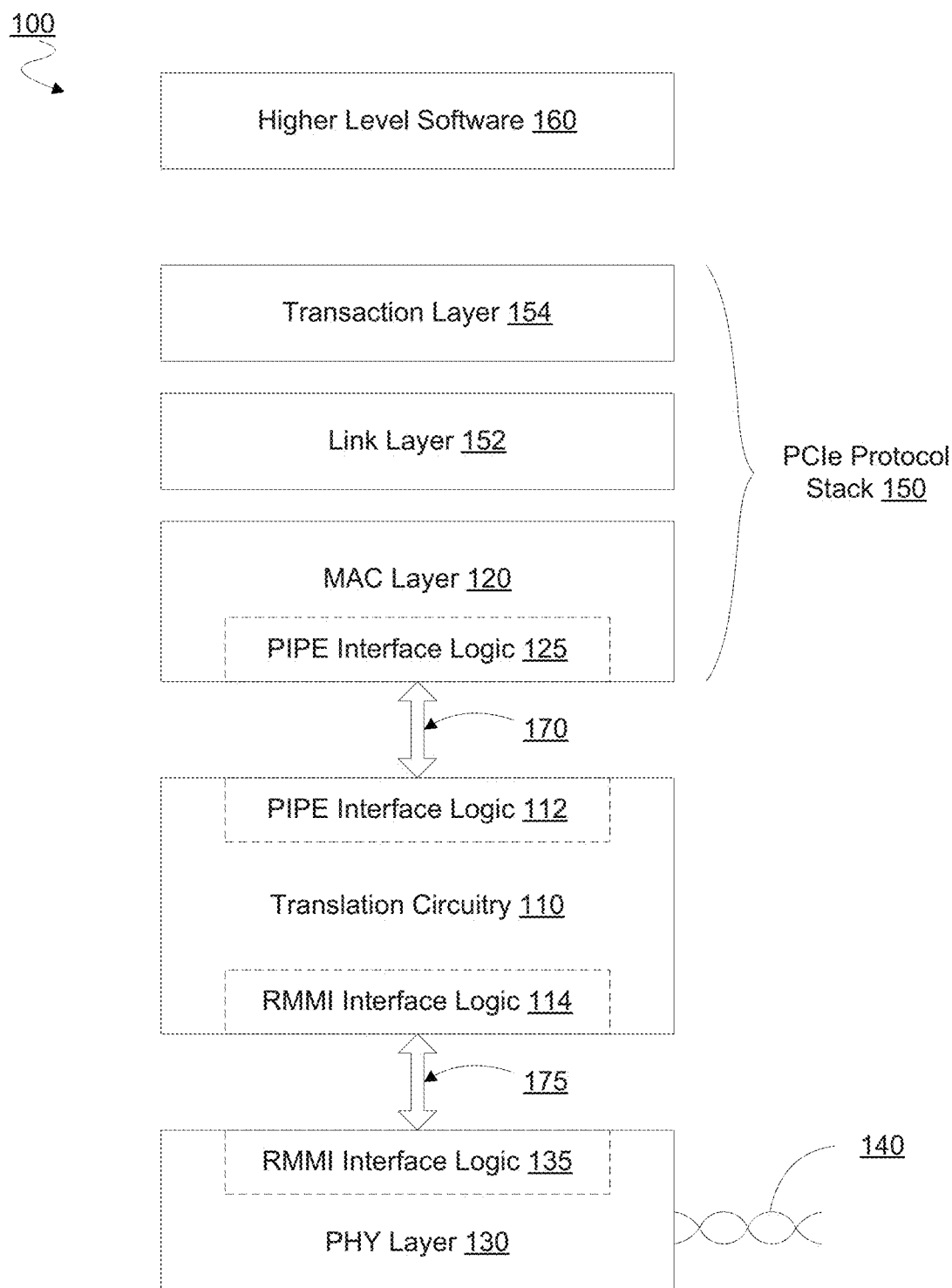
FIG. 1 is a block diagram illustrating elements of a device for exchanging data packets according to an embodiment.

Embodiments discussed herein variously provide for an input/output (IO) interconnect architecture exhibiting low power operational characteristics which, for example, are particularly suited to use in mobile devices including tablet computers, cellular telephones such as smartphones, electronic readers, Ultrabooks™, and so forth.

In various embodiments, a protocol stack for a given communication protocol may be used with a physical (PHY) unit of a different communication protocol, or at least a PHY unit different than the PHY unit for the given communication protocol. A PHY unit may include a logical layer and a physical or electrical layer that provides for the actual, physical communication of information signals over an interconnect such as a link that networks two devices or, alternatively, that links two independent semiconductor die. Such semiconductor die may be within a single integrated circuit (IC) package or separate packages, coupled, e.g., via a circuit board routing, trace or so forth. In addition the PHY unit may perform framing/deframing of data packets, perform link training and initialization, and process the data packets for delivery onto/receipt from a physical interconnect, and/or the like.

Although different implementations are possible, in one embodiment the protocol stack may be of a conventional personal computer (PC)-based communication protocol such as a PCIe™ communication protocol (hereafter a PCIe™ specification) in accordance with a PCIe™ specification such as the PCI Express™ Base Specification version 3.0 (published Nov. 18, 2010), a further version that applies protocol extensions, or another such protocol, while the PHY unit is not according to such a PCIe™ communication protocol. This PHY unit may interface with translation circuitry specially designed for purposes of enabling low power operation to allow incorporation of a conventional PCIe™ upper protocol stack with this low power PHY circuitry. In this way the broad legacy base of hardware supporting features of the PCIe™ communication protocol may be leveraged for ease of incorporation into portable and other non-PC-based form factors that operate at low power. Although the scope of the present invention is not limited in this regard, in one embodiment this PHY unit may be a PHY unit adapted from a mobile platform such as a so-called M-PHY according to the M-PHY Specification Version 1.00.00—8 Feb. 2011 (MIPI Board Approved 28 Apr. 2011) of the Mobile Industry Processor Interface (MIPI) Alliance (hereafter MIPI specification), which is a group that sets standards for mobile computing devices. However, other low power PHY units such as according to other low power specifications such as used to couple together individual dies within a multi-chip package, or a custom low power solution may be used. As used herein, the term "low power" means at a power consumption level below a conventional PC system, and which may be applicable to a wide variety of mobile and portable devices. As an example, "low power" may be a PHY unit that consumes less power than a conventional PCIe™ PHY unit.

In this way, by converging features of a traditional PCIe™ protocol stack with a different type of PHY unit, extensive reuse of legacy components that have been developed for PCIe™ may be leveraged for incorporation into a mobile or other portable or low power platform. As such, embodiments may be software compatible with ubiquitous PCIe™ architectures that have a large legacy base. In addition, embodiments may also enable direct PHY re-use of a mobile-designed PHY, e.g., a M-PHY. In this way, low active and idle power may be realized with efficient power/bit transferred, along with an approach that is electromagnetic interface/radio frequency interface (EMI/RFI) friendly, as the PHY may operate at clock rates that do not interfere with associated radios, since harmonics of the clock frequency for the PHY do not interfere with common radio frequencies at which typical radio solutions operate (e.g., 1.8, 1.9, 2.4 gigahertz (GHz) or other such radio frequencies). Alternatively or in addition, a system-on-chip (SoC) according to one embodiment may operate as a root complex that is implemented in a first IC, and is coupled directly or indirectly to a second IC that may include a radio solution, which may include one or more devices of multiple wireless communication devices. Such devices may range from low power short range communication systems such as in accordance with a Bluetooth™ specification, local wireless communications such as a so-called WiFi™ system in accordance with a given Institute of Electrical and Electronics Engineers (IEEE) 802.11 standard, to a higher power wireless system such as a given cellular communication protocol such as a 3G or 4G communication protocol.

FIG. 1 illustrates elements of a device 100 for exchanging data packets according to an embodiment. Device 100 may include a combination of software, firmware and/or hardware within one or more semiconductor components such as an integrated circuit (IC) to provide for handling of data communication between device 100 and another device (not shown) coupled thereto. In an embodiment, device 100 includes PHY layer 130 for device 100 to participate in low power communications via a link 140 coupled to device 100. Communications with low power PHY layer 130 may, in one or more respects, require a lower amount of power than that for communications with a PHY which is for PCIe™ communication. By way of illustration and not limitation, PHY layer 130 may be for communications according to a specification other than a PCIe™ communication protocol, where such communications are for device 100 to exchange information with a MIPI (or other) low-power device.

Device 100 may further comprise protocol stack logic which, for example, includes PCIe protocol stack 150 to exchange communications with PHY layer 130 via translation circuitry 110. In an illustrative embodiment, PHY unit 130 and PCIe protocol stack 150 may operate to variously process packets exchanged via link 140 according to a low power communication standard. Interconnect 140 may include a physical link coupling the device 100 with another device or component.

The processing of packets performed by PCIe protocol stack 150 may be according to one or more conventional PCIe™ packet processing techniques. The particular mechanisms of PCIe protocol stack 150 for implementing conventional PCIe™ packet processing techniques, which can vary according to implementation-specific details, are outside the scope of this document and may not be limiting on certain embodiments.

By way of illustration and not limitation, portions of PCIe™ stack 150 may include a transaction layer 154, a data link layer 152 and/or a media access control (MAC) layer 120 which variously provide at least some functionality for implementing PCIe™ communications. For example, transaction layer 154 may operate under higher level software 160 (e.g. including an OS) at least in part to generate transaction layer packets (TLP), which may be request or response-based packets separated by time, allowing the link to carry other traffic while the target device gathers data for the response. The transaction layer 154 may further handle credit-based flow control, in an embodiment. In this regard, one responsibility of transaction layer 154 may be the assembly and disassembly of packets (i.e., transaction layer packets (TLPs)), as well as handling credit-based flow control.

In turn, link layer 152 may sequence TLPs that are generated by transaction layer 154 and ensure reliable delivery of TLPs between two endpoints (including handling error checking) and acknowledgement processing. Thus link layer 152 may act as one intermediate stage between transaction layer 154 and PHY layer 130, and provide a reliable mechanism for exchanging TLPs between two components by a link. One side of link layer 152 may accept TLPs assembled by transaction layer 154, apply identifiers, calculate and apply an error detection code, e.g., cyclic recovery codes (CRC), and send the modified TLPs toward PHY layer 130.

In an embodiment, MAC layer 120 exchanges such packets with link layer 152 and performs one or more operations for MAC processing thereof. The packet processing performed by MAC layer 120 may include, for example, one or more scramble/de-scramble processing, stiping/de-striping processing, lane-lane deskew processing and/or the like. MAC layer 120 may alternatively be a component of link layer 152, in certain embodiments. Packets processed by MAC layer 120 may be the basis for communications which PHY layer 130 is to send from device 100 via interconnect 140. Additionally or alternatively, communications which PHY layer 130 receives via interconnect 140 may result in other packet processing by MAC layer 120

In one embodiment, the physical layer represented by PHY layer 130 physically transmits a packet to an external device. Such a physical layer may include a transmit section to prepare outgoing information for transmission and a receiver section to identify and prepare received information before passing it to link layer 152. The transmitter may be supplied with symbols that are serialized and transmitted to an external device. The receiver may be supplied with serialized symbols from the external device and transforms the received signals into a bitstream. The bitstream may be de-serialized and supplied to a logical sub-block. The processing of packets performed by PHY layer 130 may be according to one or more conventional packet processing techniques of a low power communication standard—e.g. a MIPI M-PHY specification. The particular mechanisms of PHY layer 130 for implementing conventional MIPI M-PHY packet processing techniques, which can vary according to implementation-specific details, are outside the scope of this document and may not be limiting on certain embodiments.

Interconnect 140 may be implemented as differential pairs of wires that may be two pairs of unidirectional wires. In some implementations, multiple sets of differential pairs may be used to increase bandwidth. Note that according to the PCIe™ communication protocol, the number of differential pairs in each direction is required to be the same. According to various embodiments, however, different numbers of pairs may be provided in each direction, which allows more efficient and lower power operation.

In an embodiment, translation circuitry 110 of device 100 is to facilitate communications between MAC layer 120 and PHY layer 130. Translation circuitry 110 may include logic for variously converting signaling between two or more PHY interface standards. In an embodiment, the two or more PHY interface standards includes a first interface standard for interfacing a PHY layer which is compatible with the PCIe™ standard with a MAC layer, data link layer or other protocol stack logic which is also compatible with a PCIe™ standard. Such a first interface may include a PHY Interface for PCI Express (PIPE) specification such as the PHY Interface for the PCI Express Architecture, PCI Express 3.0, revision 0.5, August 2008, Intel Corporation. By way of illustration and not limitation, MAC layer 120 may include PIPE interface logic 125 for an interface 170 with PIPE interface logic 112 of translation circuitry 110, which is compatible with a PIPE specification.

Additionally or alternatively, the two or more PHY interface standards may include a second interface standard for interfacing a protocol stack according to a low power specification (e.g. MIPI) with a PHY layer which is to exchange communications according to that low power specification. Such a second interface may include a Reference M-PHY Module Interface (RMMI) specification such as that set forth in the Specification for M-PHYSM, Version 2.0 of the MIPI Alliance, released Jun. 22, 2012. By way of illustration and not limitation, PHY layer 130 may include RMMI interface logic 135 for an interface 175 with RMMI interface logic 114 of translation circuitry 110 which is compatible with a RMMI specification.

In an embodiment, translation circuitry 110 provides for conversion between one or more communications exchanged by interface 112 according to the PIPE specification and one or more corresponding communications exchanged by interface 114 according to the RMMI specification. Such translation, or conversion, by translation circuitry 110 may allow for PCIe™ functionality and low power communication standard (e.g. MIPI) functionality to be integrated without requiring modification to either conventional hardware of PCIe protocol stack 150 or conventional hardware of PHY layer 130.

Figure 2:
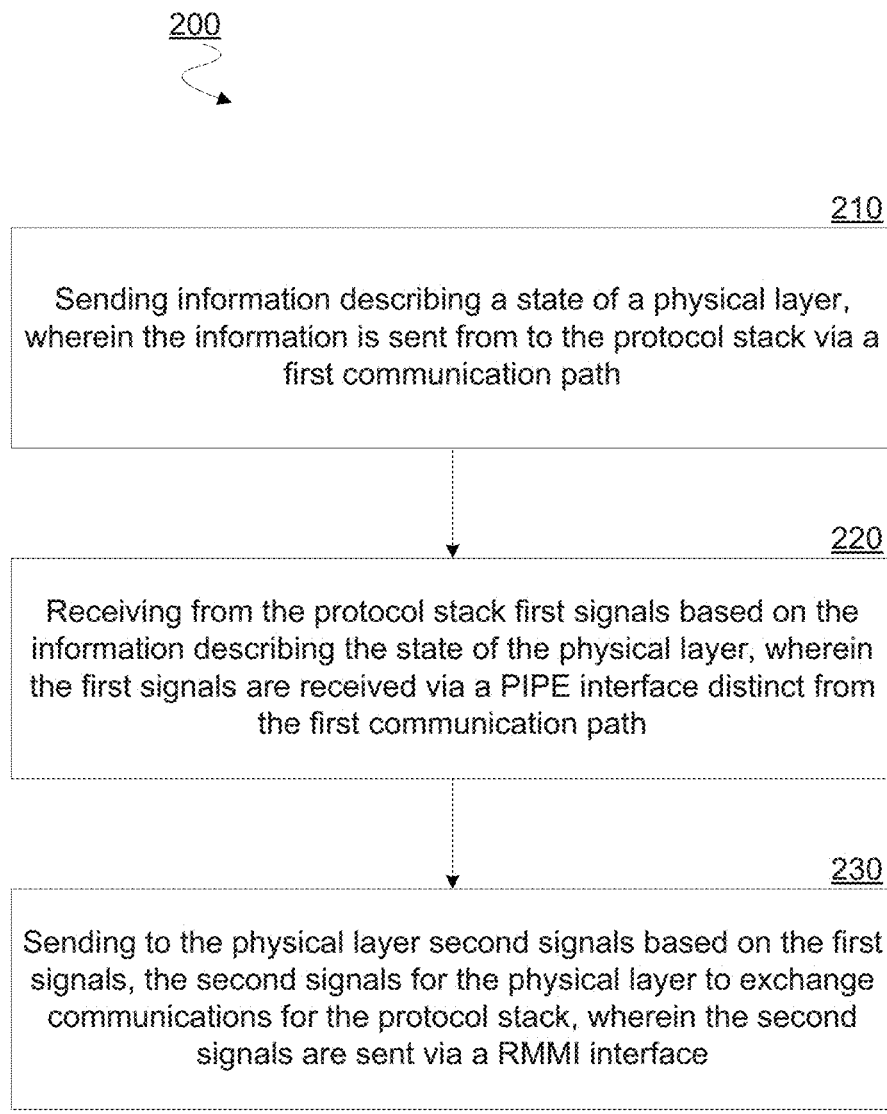
FIG. 2 is a flow diagram illustrating elements of a method for communicating with physical (PHY) layer circuitry according to an embodiment.

FIG. 2 illustrates elements of a method 200 for exchanging communications with a protocol stack and a physical layer according to an embodiment. For example, method 200 may be performed for communications exchanged with a protocol stack which operates according to one communication standard—e.g. that of a PCIe™ specification—and physical layer circuitry which operates according to a comparatively low power communication standard such as a MIPI PHY specification. In an embodiment, method 200 is performed by a device which includes some or all of the features of translation circuitry 110.

Method 200 may include, at 210, translation circuitry sending information describing a state of a physical layer, wherein the information is sent from the translation circuitry via a first communication path to a protocol stack. For example, the translation circuitry may receive from the protocol stack a request for such state information. The request may be received by the communication path, although certain embodiments are not limited in this regard. In response to such a request, the translation circuitry may access one or more registers of the PHY to determine capability state or configuration state. Such register access may, for example, include the translation circuitry exchanging one or more RMMI control interface signals via a second interface.

Method 200 may further comprise, at 220, the translation circuitry receiving from the protocol stack first signals based on the information describing the state of the physical layer. For example, the first signals may be based on one or more of the protocol stack identifying a capability of the physical layer and the protocol stack getting or setting a configuration of the physical layer. The first signal may be to control the physical layer logic for transmission and/or reception of data with the physical layer logic. The first signals may be received via a first interface of the translation circuitry which is compatible with a physical interface for Peripheral Component Interconnect Express (PIPE) specification. In an embodiment, the first interface is distinct from—e.g. is in parallel with, a sideband channel with respect to, etc.—the first communication path used at 210.

Method 200 may further comprise, at 230, the translation circuitry sending to the physical layer second signals based on the first signals, the second signals for the physical layer to exchange communications for the protocol stack. For example, the translation circuitry may include logic to perform a translation, conversion and/or other process to generate the second signals based on the first signals. The translation circuitry may provide intelligent conversion between RMMI signals and PIPE signals based on current state of the protocol stack and/or the PHY layer. In an embodiment, the second signals are sent via a second interface of the translation circuitry which is compatible with a reference mobile physical module interface (RMMI) specification.

Method 200 may include one or more other operations (not shown) to further facilitate communications with the physical layer on behalf of the protocol stack. By way of illustration and not limitation, the translation circuitry may receive via the second interface a control signal identifying a power state of the physical layer—e.g. a power state described in a MIPI PHY specification. State machine logic of the translation circuitry may transition between a set of states including a plurality of states which each correspond to a different respective power state of a PCIe™ specification. One or more state transitions of such state machine logic may be based on the received control signal, in an embodiment. The state machine logic may transition to a state which causes the translation circuitry to indicate to the protocol stack the completion of a PHY power state transition. For example, the translation circuitry may indicate an associated transition between PCIe™ power states, including pulsing a PhyStatus signal of the PIPE interface.

In an embodiment, the protocol stack may transition between a second set of states which, for example, each correspond to a respective power state according to a PCIe™ specification. In such an embodiment, method 200 may further comprise the translation circuitry receiving from the protocol stack a first control signal based on a transition of the protocol stack between the second set of states. Based on the first control signal, the translation circuitry may further send via the second interface a second control signal to transition the physical layer from a first power state to a second power state. The first power state and the second power state may each be according to a MIPI specification, for example. The translation circuitry may, in an embodiment, correspond different power states which are according to the PCIe™ specification each with the same power state according to the MIPI specification.

Figure 3:
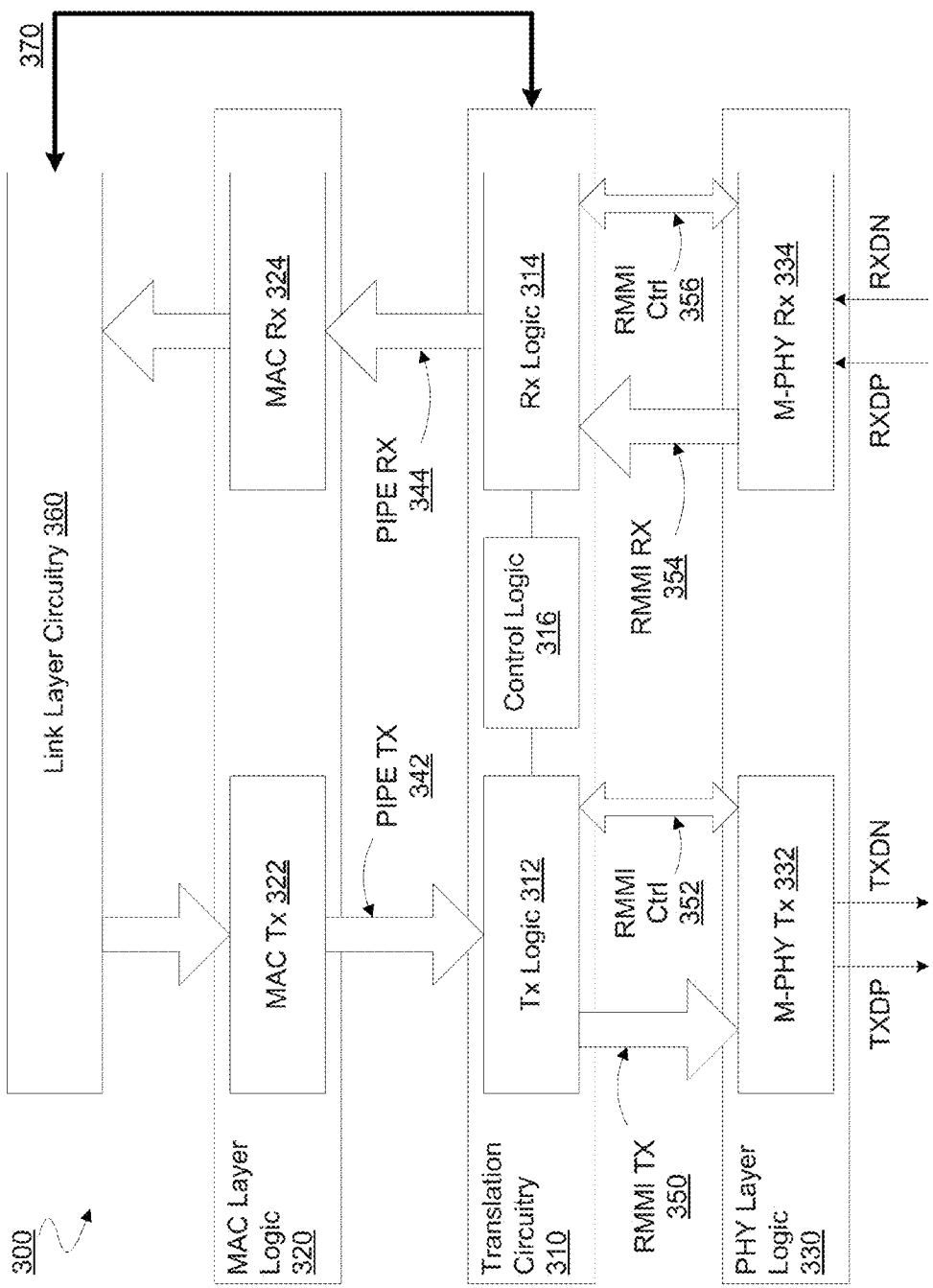
FIG. 3 is a block diagram illustrating elements of a device for processing data packets according to an embodiment.

FIG. 3 illustrates elements of a device 300 for exchanging data packets according to an embodiment. Device 300 may include some or all of the features of device 100, for example. In an embodiment, device 300 includes logic to perform the operations of method 200.

Device 300 may include PHY layer logic 330 for device 300 to participate in low power communications with another device (not shown). Device 300 may further comprise a PCIe™ protocol stack and translation circuitry 310 for the PCIe™ protocol stack to communicate with PHY layer logic 330. By way of illustration and not limitation, the PCIe™ protocol stack may include MAC layer logic 320, link layer circuitry 360 and, in an embodiment, one or more higher level protocol stack layers (not shown).

In an embodiment, MAC layer logic 320 includes transmit packet logic MAC Tx 322 to receive packets from link layer circuitry 360 and to perform MAC processing of such packets. Packet processing by MAC layer logic 320 may result in the generation of one or more signals PIPE TX 342 to be communicated in an interface with translation circuitry 310 which is compatible with a PIPE specification. Alternatively or in addition, MAC layer logic 320 may include receive logic MAC Rx 324 to receive one or more signals PIPE RX 344 communicated in such a PIPE interface with translation circuitry 310. MAC Rx 324 may perform other MAC packet processing for generating packets to subsequently be provided to link layer circuitry 360.

Translation circuitry 310 may perform one or more operations to translate or otherwise convert signals conforming to one PHY interface standard into corresponding signals which conform to a different PHY interface standard. In an embodiment, translation circuitry 310 includes transmit (Tx) logic 312 to receive PIPE TX 342 and to generate one or more signals RMMI TX 350 which represent information in PIPE TX 342. Tx logic 312 may then communicate RMMI TX 350 via an interface with PHY layer logic 330 which is compatible with an RMMI specification. Alternatively or in addition, translation circuitry 310 may include receive (Rx) logic 314 to receive one or more signals RMMI RX 354 via such a RMMI interface with PHY layer logic 330. Rx logic 314 may generate some or all of PIPE RX 344 for representing information in RMMI RX 354, and communicate PIPE RX 344 via the PIPE interface with MAC layer logic 320.

In an embodiment, PHY layer logic 330 includes transmitter M-PHY Tx 332 to transmit a differential signal pair TXDP, TXDN based on RMMI TX 350. Alternatively or in addition, PHY layer logic 330 may include receiver M-PHY Rx 334 to receive a differential signal pair RXDP, RXDN, where M-PHY Rx 334 generates RMMI RX 354 based on signal pair RXDP, RXDN. Signals TXDP, TXDN and/or signals RXDP, RXDN may be exchanged according to a MIPI M-PHY specification, in an embodiment.

Translation circuitry 310 may further provide one or more signals to configure PHY layer logic 330 for variously receiving, generating and/or transmitting signals. By way of illustration and not limitation, Tx logic 312 may provide one or more configuration signals RMMI Ctrl 352 for configuring M-PHY Tx 332. Alternatively or in addition, RX logic 314 may provide one or more configuration signals RMMI Ctrl 356 for configuring M-PHY Rx 334. Configuration of M-PHY Tx 332 based on RMMI Ctrl 352 may determine one or more characteristics of TXPD, TXPN for representing information in RMMI TX 350. Alternatively or in addition, configuration of M-PHY Rx 334 based on RMMI Ctrl 356 may determine one or more characteristics of RMMI RX 354 for representing information in RXPD, RXPN.

For example, some or all signals of RMMI TX 350 may each correspond to a respective one of the M-TX-DATA interface signals of a MIPI PHY specification. Similarly, some or all signals of RMMI Ctrl 352 may each correspond to a respective one of the M-TX-CTRL interface signals of a MIPI PHY specification. Alternatively or in addition, some or all signals of RMMI RX 354 may each correspond to a respective one of the M-RX-DATA interface signals of a MIPI PHY specification, and some or all signals of RMMI Ctrl 356 may each correspond to a respective one of the M-RX-CTRL interface signals of a MIPI PHY specification.

In an embodiment, one or more of PIPE RX 344, RMMI TX 350, RMMI Ctrl 352, and RMMI Cfg 356 may be based on a state of device 300 and/or a state of a device in communication with device 300 via PHY layer logic 330. For example, translation circuitry 310 may include control logic 316 to retrieve state information using communications of RMMI Ctrl 352 and/or communications of RMMI Ctrl 356. Alternatively or in addition, control logic 316 may evaluate information represented in PIPE TX 342 or RMMI RX 354 to detect system state including, but not limited to, one or more of a power state of PHY layer logic 330, a presence or activity of a device coupled to device 300 via PHY layer logic 330, and/or the like.

Alternatively or in addition, control logic 316 may be coupled to protocol stack logic of device 300, such as link layer circuitry 360, by a communication path 370 which is distinct from the PIPE interface with MAC layer logic 320. In this sense, communication path 370 may be considered a sideband path which, for example, is used to provide the protocol stack with access one or more registers (not shown) of PHY layer logic 330. Control logic 316 may access such registers to retrieve PHY state information which may then be communicated to link layer circuitry 360 via communication path 370. PIPE-to-RMMI translation and/or RMMI-to-PIPE translation by translation circuitry 310 may be further based on such information exchanged via communication path 370.

By way of illustration and not limitation, a request sent from link layer circuitry 360 via communication path 370 may be translated into RMMI based M-CTRL signaling for communication via RMMI Ctrl 352 and/or RMMI Ctrl 356. Such RMMI signaling may be to access capability, configuration and/or status attributes of PHY layer logic 330. For example, the MIPI PHY standards variously specify such attributes for signal transmission (M-TX) and for signal reception (M-RX), as well as a M-TX-CTRL Service Access Point (SAP) and a M-RX-CTRL SAP to provide protocol stack logic with access to such attributes. In an embodiment, link layer circuitry 360 may exchange communications via path 370 to variously get, set or otherwise access attribute information in one or more registers (not shown) of PHY layer logic 330. Such access may be performed—e.g. during the establishing of a link or runtime operation of the link—for the protocol stack to discover one or more PHY capabilities and/or to program PHY layer logic 330 to work in a particular high speed (HS) GEAR or other desired configuration. Communication path 370 may bypass one or more protocol stack layers—e.g. including MAC layer logic 320—although certain embodiments are not limited in this regard.

Figure 4:
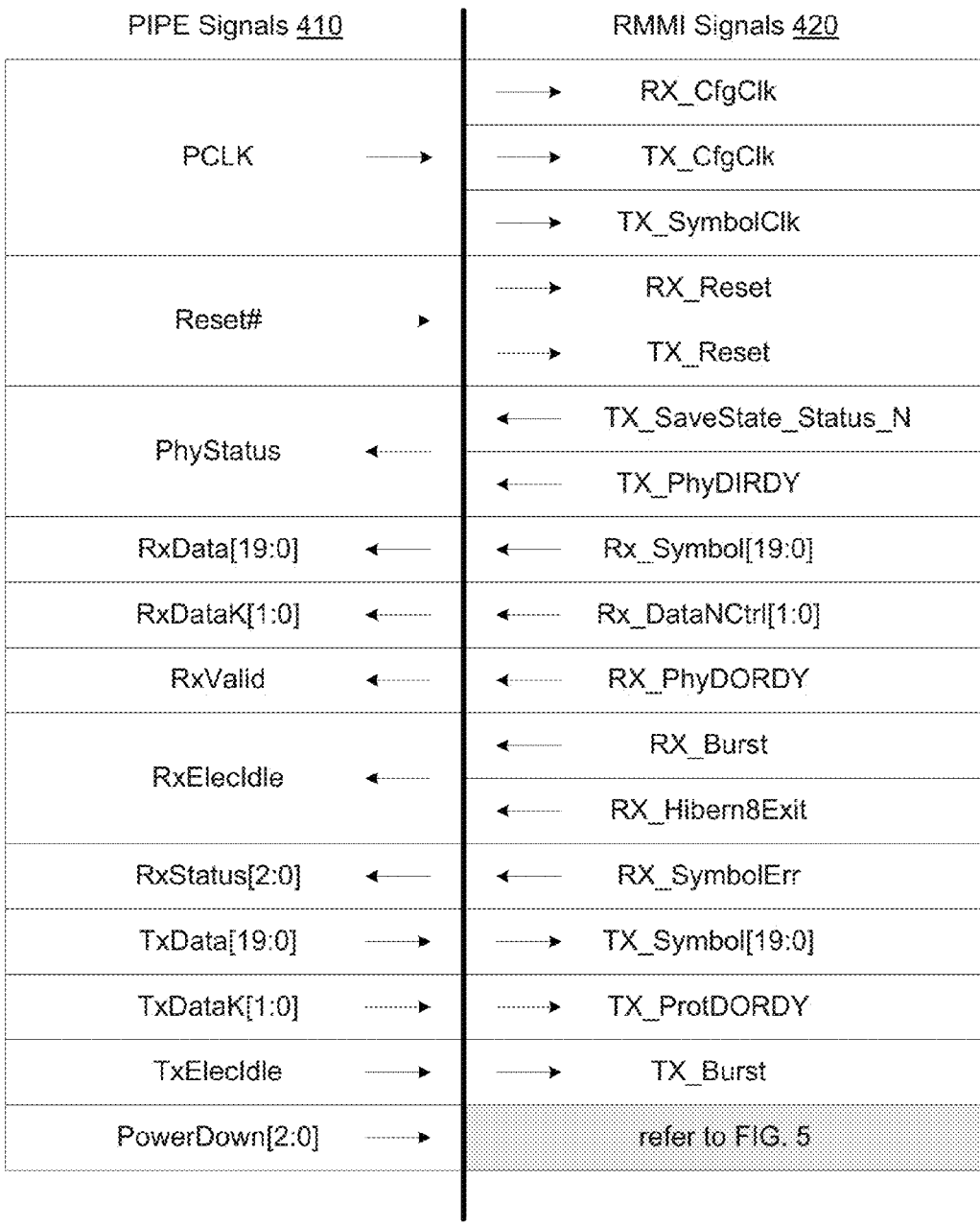
FIG. 4 is a table illustrating elements of PHY layer interface signal translation according to an embodiment.

FIG. 4 shows a table 400 illustrating how translation circuitry, according to an embodiment, variously provides for conversion between PIPE signals 410 to be exchanged with MAC layer logic and corresponding RMMI signals 420 to be exchanged with PHY layer logic. PIPE signals 410 may be signals of an interface such as that which includes PIPE TX 342 and/or PIPE RX 344, for example. Alternatively or in addition, RMMI signals 420 may be signals of an interface such as that which includes RMMI TX 350, RMMI Ctrl 352, RMMI RX 354 and/or RMMI Ctrl 356.

As shown in table 400, a parallel interface clock signal PCLK of PIPE signals 410 may be received from a MAC layer to synchronize data transfers. Correspondingly, RMMI signals 420 may include one or more corresponding clock signals such as a receive control interface clock RX_CfgClk, a transmit control interface clock TX_CfgClk and/or a symbol clock TX_SymbolClk. For example, the translation circuitry may pass and output the received PCLK as both RX_CfgClk and TX_CfgClk.

Alternatively or in addition, the MAC layer may provide a reset signal Reset#, according to a PIPE specification, for resetting a PHY transmitter and/or a PHY receiver. Based on Reset#, the translation logic may generate one or both of a RX_Reset signal and a TX_Reset for variously resetting a M-PHY receiver and a M-PHY transmitter, respectively. For example, RESET# may be an active low signal which is inverted by the translation circuitry and provided as each of active high signals TX_Reset, RX_Reset.

In an embodiment, the translation circuitry may provide the MAC layer with a PIPE status signal PhyStatus to communicate the completion of one or more PHY layer operations including, for example, power management state transitions, rate change, and receiver detection. PhyStatus may be generated by the translation circuitry as a function of a TX_SaveState_Status_N signal, which indicates that a M-PHY transmitter is entering or exiting a SAVE state, and/or a TX_PhyDIRDY signal which indicates whether a M-PHY transmitter is ready to accept new data on a TX_Symbol bus. An example of how PhyStatus may be generated based one or both of TX_SaveState_Status_N and TX_PhyDIRDY according to one embodiment is discussed herein with reference to FIG. 5.

Alternatively or in addition, the translation circuitry may provide to the MAC layer parallel PCIe™ data output signals RxData[19:0] based on corresponding symbols Rx_Symbol[19:0] received from the PHY layer according to the RMMI specification. PIPE signals RxDataK[1:0] may be further provided to communicate to the MAC layer whether particular bits of RxData[19:0], at a given time, are control bits or data bits. RxDataK[1:0] may include or otherwise be based on RMMI signals Rx_DataNCtrl[1:0] with which the PHY layer indicates a type of symbol (e.g. data symbol or control symbol) being communicated by some or all Rx_Symbol bits.

In an embodiment, the translation circuitry provides a validity signal RxValid to communicate to the MAC layer whether there is currently valid data represented with RxData[19:0] and RxDataK[1:0]. RxValid may include or otherwise be based on an RMMI signal RX_PhyDORDY with which the PHY layer indicates that data is available in a corresponding range of signal lines for RX_Symbol.

Alternatively or in addition, the translation circuitry may communicate to the MAC layer a signal RxElecIdle indicating whether an electrical idle of a PHY receiver is detected—e.g. including indicating whether a beacon signal is detected. RxElecIdle may be generated by the translation circuitry as a function of RMMI signals RX_Burst, which indicates whether a M-PHY receiver is receiving burst data, and RX_Hibern8Exit, which indicates that whether M-PHY receiver is exiting the HIBERN8 power state. An example of how RxElecIdle may be generated based on the signals RX_Burst and RX_Hibern8Exit is discussed herein with reference to FIGS. 7A-7C.

PIPE signals 410 may further comprise signals RxStatus[2:0] to communicate various PHY receiver status information to the MAC layer. In an embodiment, RxStatus[2:0] includes or is otherwise based on RMMI signal RX_SymbolErr, with which the PHY layer indicates any of various errors associated with the decoding of a received symbol.

In an embodiment, parallel PCIe™ data input bus TxData[19:0] exchanges transmit data from the MAC layer to the translation circuitry according to the PIPE specification. Based on TxData[19:0], the translation circuitry may provide to a M-PHY transmitter corresponding BURST transmit data TX_Symbol[19:0] according to the RMMI specification. The MAC layer may further provide PIPE signals TxDataK[1:0] indicating whether particular bits of TxData[19:0], at a given time, are control bits or data bits. Based on TxDataK[1:0], the translation circuitry may communicate to the PHY layer a signal TX_ProtDORDY indicating whether data is available in a corresponding bus range of TX_Symbol.

Alternatively or in addition, the translation circuitry may receive from the MAC layer a PIPE signal TxElecIdle which indicates whether a PHY transmitter is to be placed in an electrical idle state. TxElecIdle may be converted into a corresponding RMMI signal TX_Burst to indicate to the PHY layer whether (or not) a transmit BURST is to be initiated.

In an embodiment, the translation circuitry is to maintain power state information for the PHY layer. The maintaining of such power state information may include or otherwise be based on the translation circuitry mapping power states described in a PIPE specification with respective power states described in a RMMI specification. In an embodiment, a power state described in one PHY interface specification may be variously mapped to different power states described in another PHY interface specification. For example, a first PHY power state of the PIPE specification may map to one power state of the RMMI specification under one system state, but map to another power state of that same RMMI specification under a different system state.

PIPE signals 410 may include, for example, signals PowerDown[2:0] for the MAC layer to indicate a PHY power state to the translation circuitry. Based on PowerDown[2:0], the translation circuitry may communicate to the PHY layer a corresponding PHY power state of the RMMI specification. An example of how PowerDown[2:0] may be generated according to one embodiment is discussed herein with reference to FIG. 5.

Figure 5:
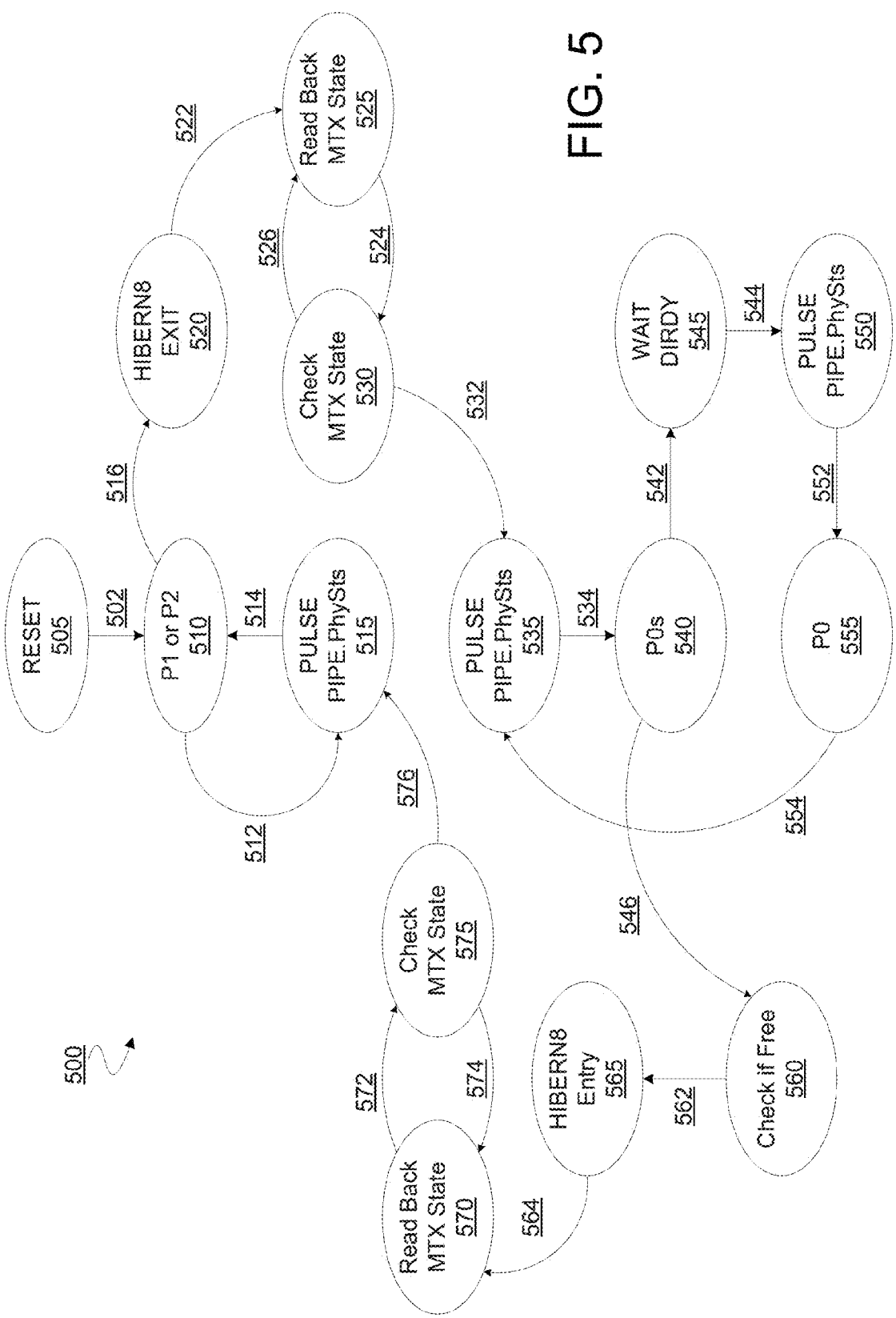
FIG. 5 is a state diagram illustrating elements of PHY layer interface signal translation according to an embodiment.

FIG. 5 illustrates elements of a state diagram 500 for providing communication with a PHY and a protocol stack, where respective operations of the PHY and the protocol stack are according to different respective communication standards. Operation of such a PHY may include translation logic successively implementing states of state diagram 500 to variously associate PHY power states of a PCIe™ specification with PHY power states of a MIPI specification. State diagram 500 may be implemented with state machine logic of the translation circuitry coupled between a protocol stack which is to operate according to a PCIe™ specification and a MIPI PHY controlled by the protocol stack. In an embodiment, such state machine logic may cause the translation circuitry to exchange signals according to a PIPE interface standard—e.g. including one or more signals to indicate a PHY state, completion of a PHY state transitions and/or other such state information. For example, such PIPE signals may include a PhyStatus signal, PowerDown[2:0] signals and/or the like. Such PIPE signals may be exchanged based on activity of the RMMI interface and/or the PIPE interface of the translation circuitry.

In an embodiment, state diagram 500 includes a reset state 505 which, for example, corresponds to an initial or other baseline state of the PHY and/or the protocol stack. From reset state 505, the state machine may transition at 502 to a state 510 corresponding to any of for one or more low power PHY states—e.g. including P1 and/or P2 of the PCIe™ 3.0 specification. In an embodiment, multiple PCIe™ PHY power states may be associated with the same MIPI PHY power state—e.g. where one or more states of state diagram 500 do not distinguish P1 and P2 from one another, and associate both P1 and P2 with the same MIPI PHY state—e.g. HIBERN8. A transition 512 from state 510 to a state 515 may take place in response the protocol stack indicating with PIPE signal PowerDown[1:0] a transition to a relatively low power PHY state—e.g. one corresponding to PCIe™ power state P2. State 515 may be for the translation circuitry to signal a pulse of the PhyStatus signal of the PIPE interface. Completion of such a pulse may result in a transition 514 back to state 510.

Alternatively or in addition, a transition 516 from state 510 to a state 520 may take place in response to PowerDown[1:0] indicating a higher power state P0s. Transition 516 may further be in response to an indication that the RMMI control interface M-CTRL is free—e.g. is available for use by the translation logic to read MTX state. State 520 may be for the translation circuitry to signal the MIPI PHY to exit the HIBERN8 power state. Such signaling—and, in embodiment, the availability of M-CTRL—may subsequently result in a transition 522 to a state 525 for reading via M-CTRL state information for the M-PHY transmitter (MTX). When the MTX state information is ready, the state diagram transitions at 524 to a state 530 for checking the MTX state which has been read.

If the state information indicates that the MTX not in SLEEP or STALL, the machine state logic may transition at 526 back to state 525 to perform another read of MTX state. Otherwise, the machine state logic transitions at 532 to a state 535 for signaling a pulse of the PIPE signal PhyStatus. After the PhyStatus pulse is performed, the machine state logic transitions at 534 to a state 540 for operation of the MTX in a MIPI power state which the translation circuitry functionally equates a particular PCIe™ PHY power state—e.g. P0s of the PCIe™ 3.0 specification. This may be the PCIe™ power state which is requested or otherwise indicated by the PIPE signals PowerDown[2:0] which initiates transition 516.

Subsequently, a transition 542 from state 540 to a state 545 may be made in response to a signal from the protocol stack indicating a higher power state. For example, transition 542 may be in response to PIPE signals PowerDown[2:0] indicating that the MTX is to transition to a state corresponding to PCIe™ power state P0. In an embodiment, state 545 is for the translation circuitry to wait for the M-PHY transmitter to be ready to accept new data. For example, a transition 544 to a state 550 may be performed in response to a TX_DIRDY signal of the RMMI interface indicating readiness of the M-PHY transmitter for new data. State 550 may be for the translation circuitry to signal a pulse of the PhyStatus signal of the PIPE interface. Completion of such a pulse may result in a transition 552 to a state 555 for the translation circuitry to transition the MTX to a high power state—e.g. a MIPI power state which the translation circuitry corresponds to PCIe™ power state P0. This may be the PCIe™ power state which is requested or otherwise indicated by the PIPE signals PowerDown[2:0] which initiates transition 542.

A transition 554 from state 550 back to state 535 may subsequently be performed in response to a signal indicating a lower power state—e.g. in response to PIPE signals PowerDown[2:0] indicating that the PHY is to transition to a MIPI power state which the translation circuitry corresponds to PCIe™ power state P0s. Transition 554 may be in further response to PIPE signal TX_SaveState_Status_N indicating that the MTX is entering into a SAVE state. Alternatively, the state machine logic may transition at 546 from state 540 to a state 560 in response to a signal from the protocol stack indicating a lower power state than P0s. For example, transition 546 may be in response to PIPE signals PowerDown[2:0] indicating that the PHY is to transition to a state corresponding to one of PCIe™ power states P1, P2.

State 560 may include the state logic determining if M-CTRL interface is free, and when it is free, to transition at 562 to a state 565 which causes the translation circuitry to place the M-TX into a MIPI HIBERN8 state. After the HIBERN8 state is entered, and while the M-CTRL interface is free, the state machine logic may transition at 564 to a state 570 for reading MTX state information via the M-CTRL interface. The state machine may transition at 572 to a state 575 for checking the MTX state has been read. If the MTX state is determined to not be HIBERN8, then a transition at 574 back to state 570 is performed to reread the MTX state. If the MTX state is determined to be HIBERN8, then a transition 576 back to state 515 is performed.

Figure 6:
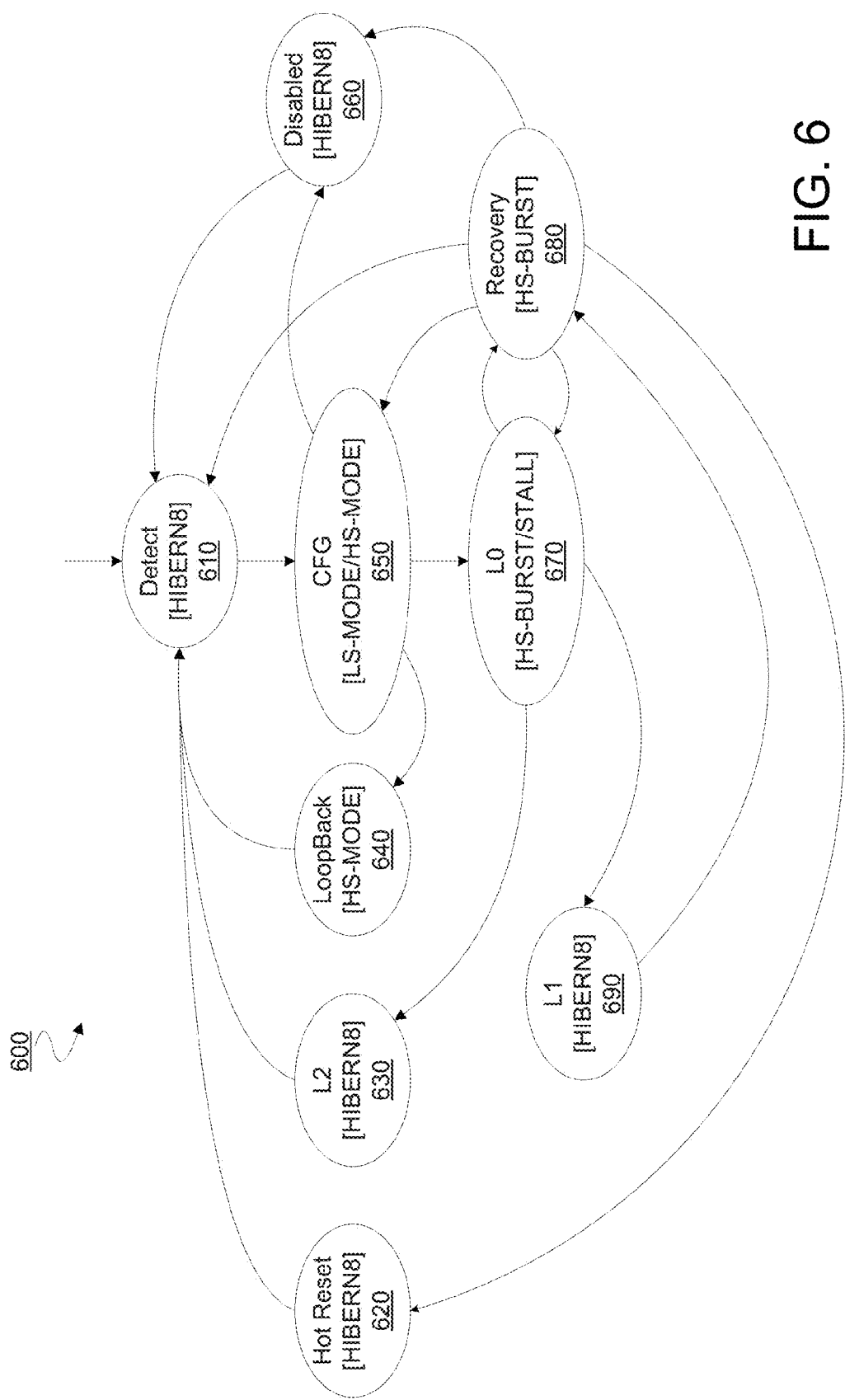
FIG. 6 is a state diagram illustrating power state transitions of a PHY layer according to an embodiment.

FIG. 6 illustrates elements of a state diagram 600 for operation of protocol stack logic according to an embodiment. The protocol stack logic may perform communications with a PHY, where respective operations of the PHY and the protocol stack are according to different respective communication standards. State diagram 600 may be performed by state machine logic of PCIe protocol stack 150, for example. For example, state diagram 600 may be implemented with link layer circuitry 360 or other link layer logic, although certain embodiments are not limited in this regard.

State diagram 600 includes various states which are each labeled to indicate a respective PCIe™ PHY state and to further indicate, in brackets, a respective MIPI PHY state which is associated with that PCIe™ PHY state. For example, protocol stack logic, translation circuitry and/or PHY layer logic may operate to according to an embodiment to map, correspond, or otherwise associate PCIe™ PHY states and MIPI PHY states with one another as indicated in FIG. 6.

State diagram 600 may include a detect state 610 which represents an initial or other baseline state after a system power-on or other reset event. Detect state 610 may also be entered from one or more other states of state diagram 600—e.g. including one or more of a hot-reset state 620, a L2 state 630, a loopback state 640 and a disabled state 660. In an embodiment, detect state 610 is may be mapped to or otherwise associated with MIPI PHY power state HIBERN8.

State diagram 600 may further include a configuration (CFG) state 650 to be entered from detect state 610. In CFG state 650, the protocol stack may exchange communications with translation circuitry—e.g. via communication path 370—to discover capabilities of the MIPI M-PHY and/or to configure attributes of the MIPI M-PHY. Such communications to determine M-PHY capabilities and/or configuration may provide for the MIPI MTX and MRX send and receive data at a configured SUB-LINK width, rate series, data rate, etc. Additionally or alternatively, lane-to-lane de-skew may be implemented, scrambling may be enabled/disabled and/or the like. CFG state 650 may be associated with either of the MIPI power states LS-MODE and HS-MODE. For example, CFG state 650 may be correspond to LS-MODE in an instance where CFG state 650 is entered from detect state 610.

After operations of CFG state 650 are complete, the state machine logic may transition to disabled state 660 for disabling one or more configured links—e.g. where it is determined that the one or more links are not to be used. Disabled state 660 may be associated with MIPI power state HIBERN8. Alternatively or in addition, operations of CFG state 650 are complete, the state machine logic may transition to loopback state 640, which in an embodiment is associated with MIPI power state HS-MODE. Loopback state 640 may be for looping back data between a loopback master and a loopback slave for test and fault isolation purposes prior to returning to detect state 610.

State diagram 600 may further include a L0 state 670 for the PCIe™ link power state L0, which corresponds to the PCIe™ PHY power state P0. In PCIe, L0 is a normal operational state for data and control packets to be transmitted and received. The other power management states L1 690 and L2 630 of state diagram 600 may be entered from L0 state 670. L0 state 670 may be associated with either of the MIPI power states HS-BURST and STALL. For example, during L0 state 670, all configured lanes of a transmit sub-link in the MIPI PHY may be permitted to enter a STALL state. When one lane enters STALL, all configured lanes of the sub-link may be required to enter STALL. Additionally or alternatively, during L0 state 670, all configured lanes of a receive sub-link in the MIPI PHY may be required to support entering STALL state. Each sub-link may be allowed to enter and exit STALL independently.

State diagram 600 may further include a recovery state 680 to be entered from L0 state 670 or, in an embodiment, from an L1 state 690. Recovery state 680 may be associated with MIPI power state HS-BURST, for example. During recovery state 680, MIPI PHY may exchange training sequences with one or both of a MTX and a MRX. Recovery state 680 may provide for (re)configuration of link bandwidth, bit lock, symbol lock, lane-to-lane de-skew and/or the like. Recovery state 680 may also be used to enter disabled state 660, hot-reset state 620, detect state 610 or CFG state 650, in an embodiment.

Hot reset 620 may include operations to implement a hot reset—e.g. according to a PCIe™ specification—for a return to detect state 610. Hot reset 620 may be associated with MIPI power state HIBERN8, in one embodiment.

In an embodiment, state diagram 600 includes L1 state 690 for the PCIe™ link power state L1, which corresponds to the PCIe™ PHY power state P1. L1 state 690 may be entered from L0 state 670, and may be used to enter recovery state 680. L1 state 690, which is intended as a power savings state, may be associated with MIPI power state HIBERN8, for example. State diagram 600 may further include L2 state 630 for the PCIe™ link power state L2, which corresponds to the PCIe™ PHY power state P2. In PCIe, power can be aggressively conserved in L2—e.g. where most of the MTX and MRX circuitry may be shut off. L2 state 630 may be associated with MIPI power state HIBERN8. L2 state 630 may be entered from L0 state 670, and may be used to enter detect state 610.

FIG. 7A is a state diagram 700 illustrating operations according to an embodiment for determining signaling to be communicated to a protocol stack. State diagram 700 may be implemented with state machine logic of the translation circuitry coupled between a protocol stack which is to operate according to a PCIe™ specification and a MIPI PHY controlled by the protocol stack. For example, translation circuitry 110 may include state machine logic to implement state diagram 700—e.g. in addition to translation circuitry 110 implementing state diagram 500.

In an embodiment, state diagram 700 includes a state 702 corresponding to a MIPI PHY being in a HIBERN8 state, a state 704 for when the MIPI PHY is not in HIBERN8, but is not exchanging a BURST of data, and a state 712 for when the MIPI PHY is exchanging a BURST of data. A transition 704 from state 702 to state 706 may be in response to a HIBERN8 exit being asserted with the RMMI signal RX_Hibern8Exit. A transition 708 from state 706 back to state 702 may be in response to a HIBERN8 entry being indicated by a deassertion of RX_Hibern8Exit. A transition 710 from state 706 to state 712 may be in response to a data burst being indicated by the RMMI signal RX_Burst during assertion of RX_Hibern8Exit. A transition 714 from state 712 back to state 702 may be in response to a subsequent deasserion of RX_Hibern8Exit.

FIG. 7B illustrates elements of a circuit 720 for generating the PIPE signal RxElecIdle based on MIPI PHY state which is indicated with various RMMI signals. Circuit 702 may be include in translation circuitry such as that which is to implement state diagram 700. Circuit 720 may perform a multiplexing between an input based on the RMMI signal RX_Burst and another input based on the RMMI signal RX_Hibern8Exit. For circuit 720, these inputs are respective inverted versions of such RMMI signals—i.e. !RX_Burst and !RX_Hibern8Exit—although certain embodiments are not limited in this regard. The PIPE signal RxElecIdle may be determined based on a multiplexing between !RX_Burst and !RX_Hibern8Exit which, for example, is according to whether state diagram 700 is in burst state 712.

FIG. 7C is a timing diagram 730 illustrating the generation of RxElecIdle based on the RMMI signals RX_Burst and RX_Hibern8Exit. As shown in timing diagram 730, RxElecIdle is the logical opposite of RX_Hibern8Exit between times t0, t3, during which a state machine RX Eidle SM (corresponding to state diagram 700) is not in Burst state 712. After transition of RX Eidle SM to a Burst state, RxElecIdle is the logical opposite of RX_Burst, and remains so until a next subsequent deassertion of RX_Hibern8Exit, which in this example occurs after time t5.

Figure 8:
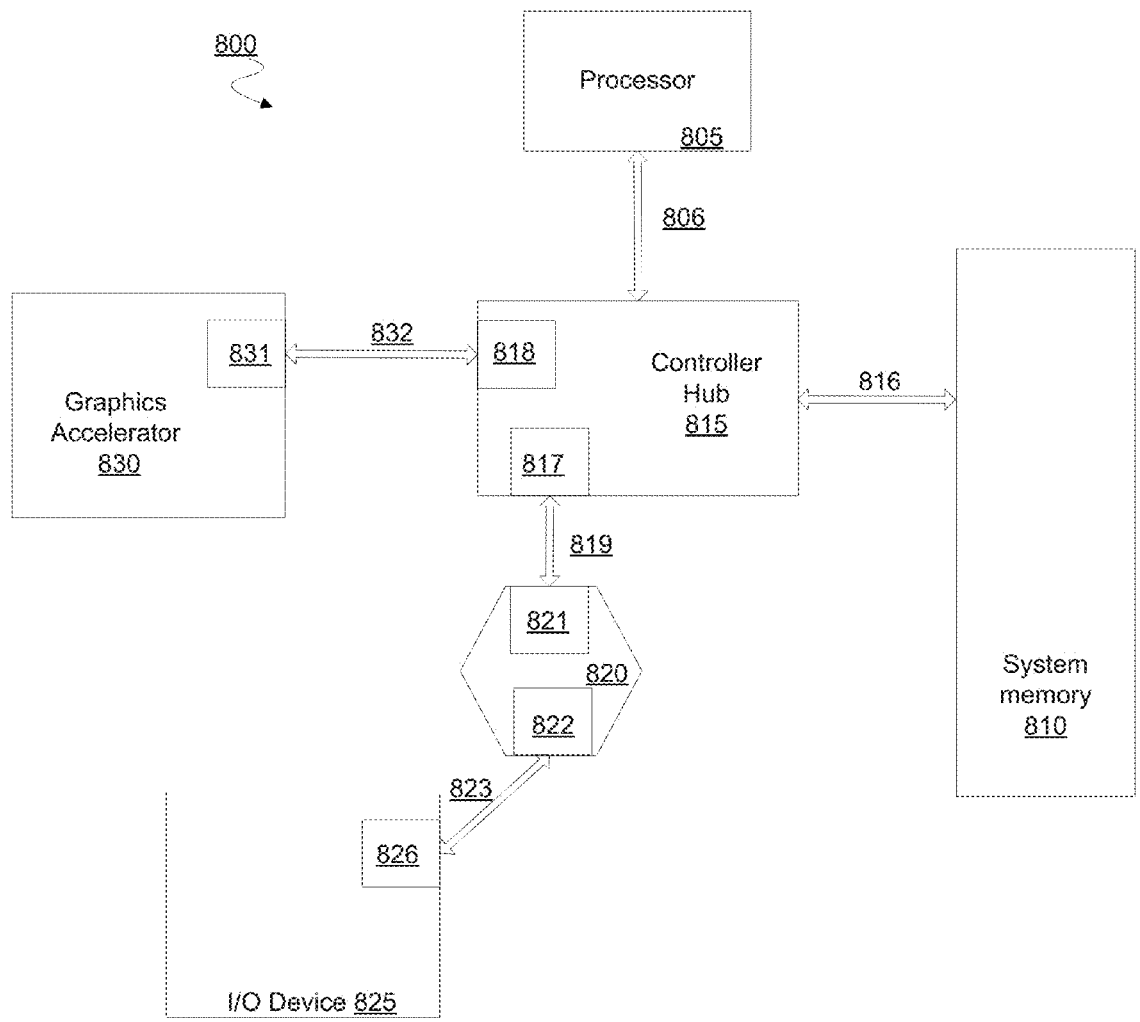
FIG. 8 is a block diagram illustrating elements of a computer system according to one embodiment.

FIG. 8 illustrates elements of a computer system 800 for processing data packets exchanged according to an embodiment. Computer system 800 includes processor 805 and system memory 810 coupled to controller hub 815. Processor 805 includes any processing element, such as a microprocessor, a host processor, an embedded processor, a co-processor, or other processor. Processor 805 is coupled to controller hub 815 through front-side bus (FSB) 806. In one embodiment, FSB 806 is a serial point-to-point interconnect as described below. In another embodiment, link 806 includes a serial, differential interconnect architecture that is compliant with different interconnect standard.

System memory 810 includes any memory device, such as random access memory (RAM), non-volatile (NV) memory, or other memory accessible by devices in computer system 800. System memory 810 is coupled to controller hub 815 through memory interface 816. Examples of a memory interface include a double-data rate (DDR) memory interface, a dual-channel DDR memory interface, and a dynamic RAM (DRAM) memory interface.

In one embodiment, controller hub 815 is a root hub, root complex, or root controller in a PCIe™ interconnection hierarchy. Examples of controller hub 815 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 805, while controller 815 is to communicate with I/O devices, in a similar manner as described below. In some embodiments, peer-to-peer routing is optionally supported through root complex 815.

Here, controller hub 815 is coupled to switch/bridge 820 through serial link 819. Input/output modules 817 and 821, which may also be referred to as interfaces/ports 817 and 821, include/implement a layered protocol stack to provide communication between controller hub 815 and switch 820. In one embodiment, multiple devices are capable of being coupled to switch 820.

Switch/bridge 820 may be further couple to device 825 via serial link 823 and respective input/output modules 822 and 826. Switch/bridge 820 may route packets/messages from device 825 upstream, i.e. up a hierarchy towards a root complex, to controller hub 815 and downstream, i.e. down a hierarchy away from a root controller, from processor 805 or system memory 810 to device 825. Switch 820, in one embodiment, is referred to as a logical assembly of multiple virtual PCI-to-PCI bridge devices. Device 825 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe™ vernacular, such as device, is referred to as an endpoint. Although not specifically shown, device 825 may include a PCIe™ to PCI/PCI-X bridge to support legacy or other version PCI devices. Endpoint devices in PCIe™ are often classified as legacy, PCIe, or root complex integrated endpoints.

Graphics accelerator 830 is also coupled to controller hub 815 through serial link 832. In one embodiment, graphics accelerator 830 is coupled to an MCH, which is coupled to an ICH. Switch 820, and accordingly I/O device 825, is then coupled to the ICH. I/O modules 831 and 818 are also to implement a layered protocol stack to communicate between graphics accelerator 830 and controller hub 815. Similar to the MCH discussion above, a graphics controller or the graphics accelerator 830 itself may be integrated in processor 805.

In one implementation, a method comprises, with translation circuitry, sending information describing a state of a physical layer, wherein the information is sent from the translation circuitry via a first communication path to a protocol stack. The method further comprises receiving from the protocol stack first signals based on the information describing the state of the physical layer, wherein the first signals are received via a first interface compatible with a physical interface for peripheral component interconnect express (PIPE) specification, the first interface distinct from the first communication path. The method further comprises sending to the physical layer second signals based on the first signals, the second signals for the physical layer to exchange communications for the protocol stack, wherein the second signals are sent via a second interface compatible with a reference mobile physical module interface (RMMI) specification.

In an embodiment, the method further comprises receiving a request from the protocol stack via the communication path and, in response to request, accessing one or more registers of the PHY to identify capability state or configuration state, wherein the state of a physical layer includes the identified capability state or configuration state. In another embodiment, the method further comprises receiving via the second interface a control signal identifying a power state of the physical layer, and with first state machine logic of the translation circuitry, transitioning between a first set of states including a plurality of states each corresponding to a different respective power state of a Peripheral Component Interconnect Express specification, including performing a first state transition based on the received control signal. In another embodiment, the first interface includes a PhyStatus signal for indicating completion of a power state transition, the method further comprising, based on the received control signal, pulsing the Phystatus signal.

In another embodiment, the protocol stack transitions between a second set of states each corresponding to a respective power state according to a Peripheral Component Interconnect Express specification, and the method further comprises receiving from the protocol stack a first control signal based on a transition of the protocol stack between the second set of states. The method further comprises sending via the second interface a second control signal based on the first control signal, the second control signal to transition the physical layer from a first power state to a second power state, the first power state and the second power state each according to a Mobile Industry Processor Interface (MIPI) specification.

In another embodiment, the translation circuitry corresponds different power states according to the Peripheral Component Interconnect Express specification each with the same power state according to the MIPI specification. In another embodiment, the method further comprises transitioning the translation circuitry among a third set of states based on control signals received via the second interface, and based on the transitioning among the third set of states, sending via the first interface a signal indicating an electric idle state of the physical layer. In another embodiment, sending the signal indicating the electric idle state based on the transitioning among the third set of states includes, in response to the transitioning among the third set of states, multiplexing between a first RMMI control signal indicating a receipt of a data burst by the physical layer and a second RMMI control signal indicating a hibernate state of the physical layer. The sending the signal indicating the electric idle state based on the transitioning among the third set of states further includes, based on the transitioning among the third set of states, generating the signal indicating the electric idle state.

In another implementation, a device comprises translation circuitry including control logic to send information describing a state of a physical layer, wherein the information is sent from the translation circuitry via a first communication path to a protocol stack. The translation circuitry further includes a first interface to couple the translation circuitry to the protocol stack, the first interface compatible with a physical interface for peripheral component interconnect express (PIPE) specification, the first interface further to receive first signals based on the information describing the state of the physical layer, wherein the first signals are received from the protocol stack independent of the first communication path, wherein based on the first signals, the translation circuitry to generate second signals for the physical layer to exchange communications for the protocol stack. The translation circuitry further includes a second interface to couple the translation circuitry to the physical layer, the second interface compatible with a reference mobile physical module interface (RMMI) specification, the second interface further to send the second signals to the physical layer.

In an embodiment, the control logic is further to receive a request from the protocol stack via the communication path, and in response to request, to access one or more registers of the PHY including capability state or configuration state, wherein the state of a physical layer includes the capability state or configuration state. In another embodiment, the second interface is further to receive a control signal identifying a power state of the physical layer, the translation circuitry further comprising first state machine logic to transition between a first set of states including a plurality of states each corresponding to a different respective power state of a Peripheral Component Interconnect Express specification, wherein the first state machine logic to perform a first state transition based on the received control signal.

In another embodiment, the first interface is to send a PhyStatus signal indicating completion of a power state transition, wherein a pulse of the Phystatus signal is based on the received control signal. In another embodiment, the protocol stack transitions between a second set of states each corresponding to a respective power state according to a Peripheral Component Interconnect Express specification, the device further comprising the translation circuitry to receive from the protocol stack a first control signal based on a transition of the protocol stack between the second set of states. The second interface is to send a second control signal based on the first control signal, the second control signal to transition the physical layer from a first power state to a second power state, the first power state and the second power state each according to a Mobile Industry Processor Interface (MIPI) specification.

In another embodiment, the translation circuitry is to correspond different PHY power states according to the Peripheral Component Interconnect Express specification each with the same PHY power state according to the MIPI specification. In another embodiment, the translation circuitry further comprises second state machine logic to transition among a third set of states based on control signals received via the second interface, wherein based on a transition of the second state machine logic, the first interface to send a signal indicating an electric idle state of the physical layer.

In another implementation, a system comprises a protocol stack, a physical layer circuitry to exchange communications for the protocol stack and translation circuitry coupled between the protocol stack and the physical layer. The translation circuitry includes control logic to send information describing a state of the physical layer, wherein the information is sent from the translation circuitry via a first communication path to the protocol stack. The translation circuitry further includes a first interface coupling the translation circuitry to the protocol stack, the first interface compatible with a physical interface for peripheral component interconnect express (PIPE) specification, the first interface further to receive first signals based on the information describing the state of the physical layer, wherein the first signals are received from the protocol stack independent of the first communication path, wherein based on the first signals, the translation circuitry to generate second signals for the physical layer to exchange communications for the protocol stack. The translation circuitry further includes a second interface coupling the translation circuitry to the physical layer, the second interface compatible with a reference mobile physical module interface (RMMI) specification, the second interface further to send the second signals to the physical layer.

In an embodiment, the control logic is further to receive a request from the protocol stack via the communication path, and in response to request, to access one or more registers of the PHY including capability state or configuration state, wherein the state of a physical layer includes the capability state or configuration state. In another embodiment, the second interface is further to receive a control signal identifying a power state of the physical layer, the translation circuitry further comprising first state machine logic to transition between a first set of states including a plurality of states each corresponding to a different respective power state of a Peripheral Component Interconnect Express specification, wherein the first state machine logic to perform a first state transition based on the received control signal. In another embodiment, the first interface is to send a PhyStatus signal indicating completion of a power state transition, wherein a pulse of the Phystatus signal is based on the received control signal.

In another embodiment, the protocol stack is to transition between a second set of states each corresponding to a respective power state according to a Peripheral Component Interconnect Express specification, the translation circuitry to receive from the protocol stack a first control signal based on a transition of the protocol stack between the second set of states. The second interface is to send a second control signal based on the first control signal, the second control signal to transition the physical layer from a first power state to a second power state, the first power state and the second power state each according to a Mobile Industry Processor Interface (MIPI) specification.

In another embodiment, the translation circuitry is to correspond different PHY power states according to the Peripheral Component Interconnect Express specification each with the same PHY power state according to the MIPI specification. In another embodiment, the translation circuitry further comprises second state machine logic to transition among a third set of states based on control signals received via the second interface, wherein based on a transition of the second state machine logic, the first interface to send a signal indicating an electric idle state of the physical layer.

Techniques and architectures for providing device interconnection are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising: with translation circuitry:
    sending information describing a state of a physical layer, wherein the information is sent from the translation circuitry via a first communication path to a protocol stack;
    receiving from the protocol stack first signals based on the information describing the state of the physical layer, wherein the first signals are according to a physical interface for peripheral component interconnect express (PIPE) specification of a Peripheral Component Interconnect Express standard, wherein the first signals are received via a first interface compatible with the PIPE specification, the first interface distinct from the first communication path;
    translating the first signals into second signals, wherein the second signals are according to a reference mobile physical module interface (RMMI) specification of a Mobile Industry Processor Interface (MIPI) physical layer standard; and
    sending the second signals from the translation circuitry to the physical layer via a second interface compatible with the RMMI specification, wherein the physical layer participates in communication on behalf of the protocol stack.

2. The method of claim 1, further comprising:
    receiving a request from the protocol stack via the communication path;
    in response to request, accessing one or more registers of the PHY to identify capability state or configuration state, wherein the state of a physical layer includes the identified capability state or configuration state.

3. The method of claim 1, further comprising:
    receiving via the second interface a control signal identifying a power state of the physical layer;
    with first state machine logic of the translation circuitry, transitioning between a first set of states including a plurality of states each corresponding to a different respective power state of the Peripheral Component Interconnect Express standard, including performing a first state transition based on the received control signal.

4. The method of claim 3, wherein the first interface includes a PhyStatus signal for indicating completion of a power state transition, the method further comprising:
    based on the received control signal, pulsing the Phystatus signal.

5. The method of claim 1, wherein the protocol stack transitions between a second set of states each corresponding to a respective power state according to the Peripheral Component Interconnect Express standard, the method further comprising:
    receiving from the protocol stack a first control signal based on a transition of the protocol stack between the second set of states; and
    sending via the second interface a second control signal based on the first control signal, the second control signal to transition the physical layer from a first power state to a second power state, the first power state and the second power state each according to the Mobile Industry Processor Interface (MIPI) physical layer standard.

6. The method of claim 5, wherein the translation circuitry corresponds different power states according to the Peripheral Component Interconnect Express standard each with the same power state according to the MIPI physical layer standard.

7. The method of claim 1, further comprising:
    transitioning the translation circuitry among a third set of states based on control signals received via the second interface; and based on the transitioning among the third set of states, sending via the first interface a signal indicating an electric idle state of the physical layer.

8. The method of claim 7, wherein sending the signal indicating the electric idle state based on the transitioning among the third set of states includes:
in response to the transitioning among the third set of states, multiplexing between a first RMMI control signal indicating a receipt of a data burst by the physical layer and a second RMMI control signal indicating a hibernate state of the physical layer; and
based on the transitioning among the third set of states, generating the signal indicating the electric idle state.

9. A device comprising: translation circuitry including:
control logic to send information describing a state of a physical layer, wherein the information is sent from the translation circuitry via a first communication path to a protocol stack;
a first interface to couple the translation circuitry to the protocol stack, the first interface compatible with a physical interface for peripheral component interconnect express (PIPE) specification of a Peripheral Component Interconnect Express standard, the first interface further to receive first signals based on the information describing the state of the physical layer, wherein the first signals are according to the PIPE specification, wherein the first signals are received from the protocol stack independent of the first communication path, the translation circuitry to translate the first signals into second signals, wherein the second signals are according to a reference mobile physical module interface (RMMI) specification of a Mobile Industry Processor Interface (MIPI) physical layer standard; and
a second interface to couple the translation circuitry to the physical layer, the second interface compatible with the RMMI specification, the second interface further to send the second signals from the translation circuitry to the physical layer.

10. The device of claim 9, the control logic further to receive a request from the protocol stack via the communication path, and in response to request, to access one or more registers of the PHY including capability state or configuration state, wherein the state of a physical layer includes the capability state or configuration state.

11. The device of claim 9, the second interface further to receive a control signal identifying a power state of the physical layer, the translation circuitry further comprising:
first state machine logic to transition between a first set of states including a plurality of states each corresponding to a different respective power state of the Peripheral Component Interconnect Express standard, wherein the first state machine logic to perform a first state transition based on the received control signal.

12. The device of claim 11, wherein the first interface to send a PhyStatus signal indicating completion of a power state transition, wherein a pulse of the Phystatus signal is based on the received control signal.

13. The device of claim 9, wherein the protocol stack transitions between a second set of states each corresponding to a respective power state according to the Peripheral Component Interconnect Express standard, the device further comprising:
the translation circuitry to receive from the protocol stack a first control signal based on a transition of the protocol stack between the second set of states; and
wherein the second interface to send a second control signal based on the first control signal, the second control signal to transition the physical layer from a first power state to a second power state, the first power state and the second power state each according to the Mobile Industry Processor Interface (MIPI) physical layer standard.

14. The device of claim 13, wherein the translation circuitry to correspond different PHY power states according to the Peripheral Component Interconnect Express specification each with the same PHY power state according to the MIPI physical layer standard.

15. The device of claim 9, the translation circuitry further comprising:
second state machine logic to transition among a third set of states based on control signals received via the second interface, wherein based on a transition of the second state machine logic, the first interface to send a signal indicating an electric idle state of the physical layer.

16. A system comprising:
a protocol stack;
a physical layer circuitry to exchange communications for the protocol stack;
translation circuitry coupled between the protocol stack and the physical layer, the translation circuitry including:
control logic to send information describing a state of the physical layer, wherein the information is sent from the translation circuitry via a first communication path to the protocol stack;
a first interface coupling the translation circuitry to the protocol stack, the first interface compatible with a physical interface for peripheral component interconnect express (PIPE) specification of a Peripheral Component Interconnect Express standard, the first interface further to receive first signals based on the information describing the state of the physical layer, wherein the first signals are according to the PIPE specification, wherein the first signals are received from the protocol stack independent of the first communication path, the translation circuitry to translate the first signals into second signals, wherein the second signals are according to a reference mobile physical module interface (RMMI) specification of a Mobile Industry Processor Interface (MIPI) physical layer standard; and
a second interface coupling the translation circuitry to the physical layer, the second interface compatible with the RMMI specification, the second interface further to send the second signals from the translation circuitry to the physical layer.

17. The system of claim 16, the control logic further to receive a request from the protocol stack via the communication path, and in response to request, to access one or more registers of the PHY including capability state or configuration state, wherein the state of a physical layer includes the capability state or configuration state.

18. The system of claim 16, the second interface further to receive a control signal identifying a power state of the physical layer, the translation circuitry further comprising:
first state machine logic to transition between a first set of states including a plurality of states each corresponding to a different respective power state of the Peripheral Component Interconnect Express standard, wherein the first state machine logic to perform a first state transition based on the received control signal.

19. The system of claim 18, wherein the first interface to send a PhyStatus signal indicating completion of a power state transition, wherein a pulse of the Phystatus signal is based on the received control signal.

20. The system of claim 16, wherein the protocol stack to transition between a second set of states each corresponding to a respective power state according to the Peripheral Component Interconnect Express standard, the translation circuitry to receive from the protocol stack a first control signal based on a transition of the protocol stack between the second set of states; and wherein the second interface to send a second control signal based on the first control signal, the second control signal to transition the physical layer from a first power state to a second power state, the first power state and the second power state each according to the Mobile Industry Processor Interface (MIPI) physical layer standard.

21. The system of claim 20, wherein the translation circuitry to correspond different PHY power states according to the Peripheral Component Interconnect Express standard each with the same PHY power state according to the MIPI physical layer standard.

22. The system of claim 16, the translation circuitry further comprising:

second state machine logic to transition among a third set of states based on control signals received via the second interface, wherein based on a transition of the second state machine logic, the first interface to send a signal indicating an electric idle state of the physical layer.

* * * * *